Aug. 22, 1967     P. MAUCHER     3,337,016
FRICTION CLUTCH
Filed Oct. 24, 1965     2 Sheets-Sheet 1

United States Patent Office 3,337,016
Patented Aug. 22, 1967

3,337,016
FRICTION CLUTCH
Paul Maucher, Stuttgart-Gablenberg, Germany, assignor to Luk Lamellen und Kupplungsbau Gesellschaft mit beschrankter Haftung, Buhl, Baden, Germany
Filed Oct. 24, 1965, Ser. No. 504,770
Claims priority, application Germany, Oct. 26, 1964, L 49,115
5 Claims. (Cl. 192—68)

ABSTRACT OF THE DISCLOSURE

Friction clutch having pressure plate with dish spring biasing the pressure plate toward engaging position and with two-arm levers operable for retracting the pressure plate and with the centrifugal force acting on the two-arm levers aiding the action of the dish spring.

---

The present invention relates to a friction clutch with a clutch cover having pivotally connected thereto two-arm release levers extending approximately radially with regard to the axis of the clutch. The outer arms of said levers are interconnected through tie-rod means which are connected to a pressure plate. The tie-rod means extends through the respective lever arm and by means of an intermediate member firmly connected thereto rests on that lever side which is located opposite said pressure plate, said lever arm being urged toward said intermediate member by a spring.

The above mentioned release levers of the friction clutch are adapted during the rotation of the clutch to be acted upon by centrifugal forces which increase to the fourth power with the increase of the angular velocity of the clutch.

Heretofore known friction clutches of the above mentioned general type have the drawback that the centrifugal or normal forces exert a torque upon the release levers which has the tendency to shift the release levers to their release position. As a result thereof, these centrifugal forces act counter to those forces which press the pressure plate against the clutch disc. Consequently, this pressing force of the pressure plate against the clutch disc and thus also the torque adapted to be conveyed by the clutch will decrease with increasing speed.

A further drawback of heretofore known clutches of the type involved consists in that between the pressure plate and the release levers there are arranged helical springs which require considerable space and result in a bulky design of the clutch.

It is, therefore, an object of the present invention to provide a friction clutch of the above mentioned general type which will bring about that also with increasing speed, the torque adapted to be conveyed by the clutch will not decrease.

It is another object of this invention to provide a clutch as set forth in the preceding paragraph in which the torque adapted to be conveyed by the clutch will at least be maintained with increasing wear.

It is another object of this invention to provide a clutch as set forth above which will make it possible to increase the torque adapted to be conveyed by the clutch when the brake lining wears and the speed increases.

It is a further object of this invention to provide a clutch as outlined above which will be particularly favorable with motor vehicles and with internal combustion engines which at a low speed have a lower torque than at a high speed.

These and other objects and advantages of the invention will appear more clearly from the following specification in connection with the accompanying drawings, in which.

Figure 1:
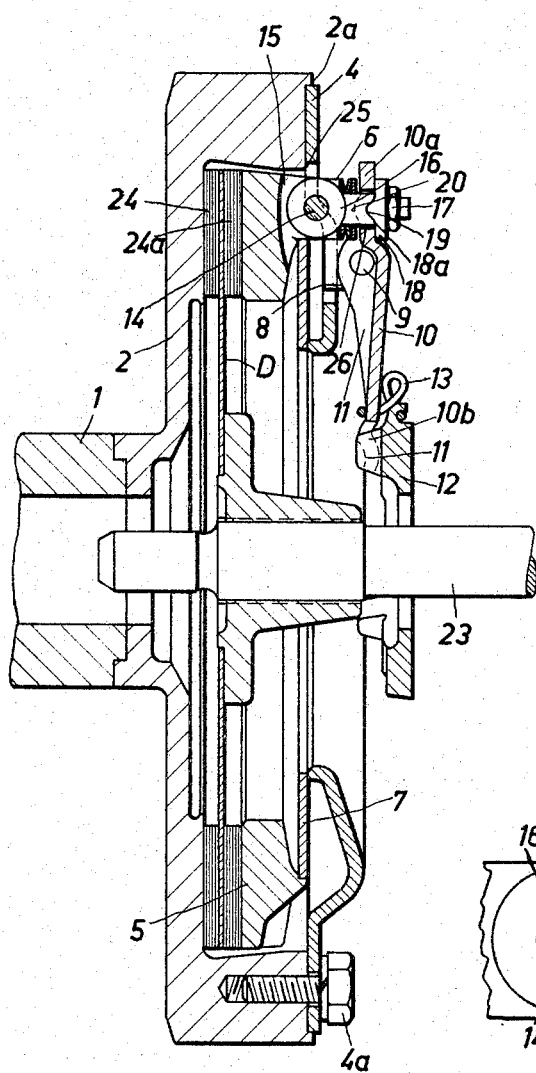
FIG. 1 is an axial section through a clutch according to the present invention.

The clutch according to the present invention is characterized primarily in that the center of gravity of the two-arm lever is axially spaced from the pivot point of the bolt and, more specifically, is located on that side of the bolt which faces away from the pressure plate. In this way, a torque increasing with the speed will act upon the release lever of the clutch. This torque has the tendency to tilt the release lever about the pivot axis in that direction in which the release levers tilt when engaging the clutch. Consequently, the pressure force exerted by the release levers upon the pressure plate increase with increasing speed so that the torque adapted to be conveyed by the clutch will increase.

According to a further feature of the present invention, the center of gravity of the release lever, when viewing in radial direction, is located further inwardly than the pivot axis of the release lever. In this way, the axial distance between the pivot point of the bolt and the center of gravity of the release lever will when the thickness of the clutch lining decreases, for instance due to wear, become greater whereby also the centrifugal moment acting upon the release lever will increase.

According to a further development of the present invention, the release lever is designed in the form of a plate which is provided with at least one rib directed toward the pressure plate, said rib having a bearing recess for the bolt. In this way, it is possible in a simple manner to assure the above mentioned position of the center of gravity of the release lever.

According to a further feature of the present invention, the intermediate member is provided with an edge resting in a corresponding depression of the release lever. In this connection, it is advantageous to make the intermediate member adjustable on the tie-rod means, preferably by means of a threaded nut. Between the pressure plate and the outer lever arm of the release lever there is provided at least one pressure spring in the form of dish springs which extends around the tie-rod means. Such dish springs will with a short axial extension of the pressure spring furnish a high pressure force which will assure a safe and play-free engagement of the release lever with the intermediate member.

Referring now to the drawing in detail, a clutch according to the invention as illustrated therein comprises a flywheel 2 connected to a drive shaft 1. Said flywheel is provided with marginal flanges so as to form a pan-like body. The free end face 2a of said flywheel has connected thereto a cover plate 4 by means of screws 4a. Arranged within flywheel 2 is a pressure plate 5 which is movable in axial direction of the axis of rotation of said flywheel and relative thereto. That side of pressure plate 5 which faces in the direction toward the drive shaft 1 is provided with a frictional lining 24a, while the flywheel area opposite said lining 24a is provided with a frictional lining 24. Interposed between the frictional linings 24 and 24a is a clutch disc D which is rotatably connected to an output shaft 23.

Pressure plate 5 has its outer marginal portion which faces away from the frictional linings 24, 24a provided with three axially extending and circumferentially uniformly spaced cam-shaped protrusions 6 which are each provided with a slot 15 having pivotally journalled therein a tie-rod 16. The tiltable journalling of tie-rod 16 is effected by means of a bolt 14 which is journalled in legs 6a of the protrusions 6. Bolt 14 extends through a corresponding bore in tie-rod 16. Cam-shaped protrusions 6 extend through corresponding cutouts 25 in clutch cover 4 in such a way that pressure plate 5 is adapted to be axially displaced with regard to cover or cover plate 4 but is non-rotatable relative thereto.

Cover plate 4 has within the range of each protrusion 6 two outwardly bent portions forming two ears 8 spaced from each other which serve as support for two-arm levers 10. More specifically, the levers 10 are tiltable about bolt 9 which are mounted in adjacent ears 8 and extend substantially parallel to the respective adjacent tie-rod 16. As will be evident from FIGS. 1 and 2, the two-arm levers 10 extend substantially in radial direction with regard to the flywheel. The outer lever arm 10a of each of said levers 10 is passed through by a tie-rod 16, while the inner lever arm 10b engages a pressure member 12.

The outer lever arm 10a of each lever 10 is provided with a passage 26 through which extends the respective adjacent tie-rod 16. The outer end of tie-rod 16 has mounted thereon an intermediate member 18 which is adapted to be adjusted on said tie-rod in longitudinal direction thereof by means of a nut 17. Intermediate member 18 has an edge-shaped portion 18a which engages corresponding depression 19 provided in the outer lever arm 10a. The outer lever arm 10a of lever 10 is by means of dish springs 21 subjected to a spring force acting in the direction toward intermediate member 18 so that edge-shaped portion 18a firmly engages depression 19.

Figure 3:
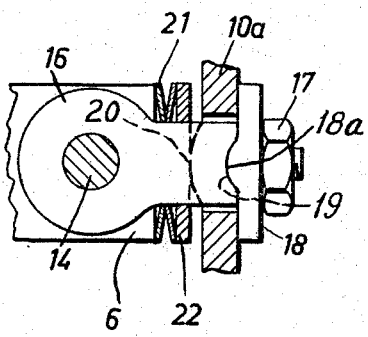
FIG. 3 is an enlargement of that portion of FIG. 1 which is encircled by dot-dash lines.

As will be seen from FIG. 3, the dish springs 21 engage the respective adjacent end face of cam-shaped protrusion 6 and through a washer 22 act upon the convex portion 20 of lever arm 10a. In this way, between springs 21 and outer lever arm 10a a joint is formed which will assure an easy tilting or pivoting of lever 10.

Figure 4:
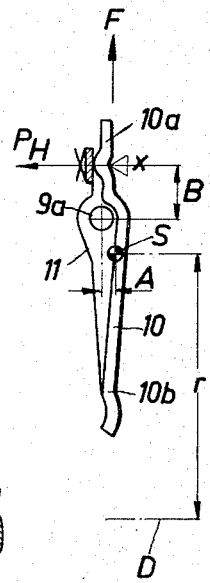
FIG. 4 is a diagrammatic representation of a release lever in the position shown in FIG. 1.

As will be seen from the diagrammatic illustration of lever 10 in FIG. 4, lever 10 is so designed that its center of gravity S is located in axial direction of the clutch at a distance A from the tilting axis 9a of lever 10. Center of gravity S is spaced from pressure plate 5 by a distance greater than the distance between the pivot axis 9a of lever 10 and pressure plate 5. During the rotation of the clutch, a centrifugal or normal force acts upon lever 10 which force can be considered as attacking in center of gravity S. The centrifugal force F is expressed by the equation $$F = M \times r \times \omega^2$$

In this formula M represents the mass of two-arm lever 10, whereas r represents the distance of the center of gravity S from the axis of rotation D' of the clutch. ω is the angular velocity. The centrifugal force F exerts upon lever 10 a moment which tends to turn lever 10 counterclockwise with regard to FIG. 4. As a result thereof, the outer lever arm 10a of lever 10 presses with a force corresponding to said moment against pressure plate 5 so that the pressing force by which pressure plate 5 presses against flywheel 2 will increase with increasing velocity or speed of the clutch.

As will be seen from FIG. 4, the center of gravity S of lever 10 is radially closer to the axis of rotation D' of the clutch than the pivot axis 9a. This arrangement brings about that with decreasing thickness of the frictional linings 24, 24a, the distance A will increase so that also the centrifugal moment acting upon lever 10 during the rotation of the clutch, and thus the force by which the pressure plate 5 acts upon flywheel 2 will increase. The force $P_H$ by which the outer lever arm 10a of lever 10 presses against the pressure plate 5 is expressed by the equation $$P_H = F \times (A:B)$$

in this equation, B represents the radial distance of pivot axis 9a of clutch lever 10 from the engaging area 20 of the outer lever arm 10 with the protrusions 6 or washer 22. For purposes of disengaging the clutch, the inner lever arms 10b are by means of pressure member 12 tilted in leftward direction against the force of dish spring 7. As a result thereof, the center of gravity of each lever 10 moves toward the left so that the distance A between center of gravity S and tilting axis 9a will become shorter. As a result, also the centrifugal moment acting upon lever 10 becomes less so that for purposes of disengaging the clutch, a force will be required which decreases with the disengaging stroke of pressure member 12. The clutch according to the invention may be so designed that the center of gravity S in disengaged condition of the clutch will be located on that side of tilting axis 9a which faces toward the fly-wheel 2. Dish spring 7 furnishes the force by which pressure plate 5 is pressed against fly-wheel 2.

Figure 2:
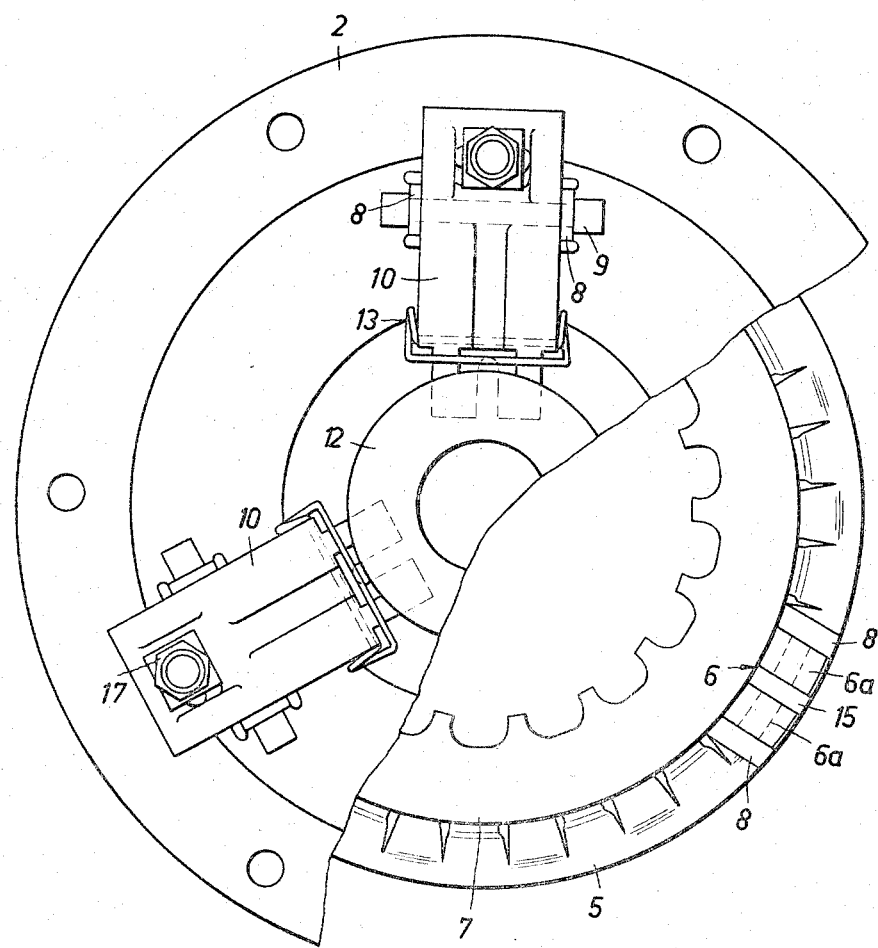
FIG. 2 illustrates the clutch of FIG. 1 as seen from the right-hand side of FIG. 1.

As will also be seen from FIGS. 1 and 2, a spring 13 is provided between the inner lever arm 10b of each lever 10 and the pressure member 12. Spring 13 presses the respective lever arm 10b against the adjacent contacting region of pressure member 12. Furthermore, levers 10 are provided with ribs 11 which have a bore for journalling bolt 9.

It is, of course, to be understood that the present invention is, by no means, limited to the particular arrangement shown in the drawings but also comprises any modifications within the scope of the appended claims.

What I claim is:

1. A friction clutch for motor vehicles, which includes: an output shaft, a rotatable flywheel having an axis of rotation and adapted to be connected to a driving shaft of an engine and provided with an axially extending peripheral annular flange, annular cover plate means connected to the free end face of said flange and extending radially inward therefrom, follower disc means arranged within said flange and connected to said output shaft for rotation therewith, pressure disc means axially displaceably arranged within said flange and operable selectively to be moved into and out of frictional driving connection with said follower disc means, annular dish spring means supported at its outer periphery by said pressure disc means and having its inner periphery provided with substantially radially inwardly extending and circumferentially spaced tongues, the inner end portions of said tongues being engaged by the radially inner edge portion of said cover plate means, a plurality of pivot means supported by said cover plate means and circumferentially spaced from each other, the axis of each of said pivot means being disposed in a plane perpendicular to the axis of rotation of said flywheel and extending in a direction perpendicular to a radius drawn from the axis of rotation of the flywheel to the respective pivot means, a plurality of substantially radially extending two-arm lever means respectively pivotally supported by said pivot means for respectively pivoting about the axes thereof, the center of gravity of each of said two-arm lever means being spaced from the plane extending through the respective pivot axis of said pivot means and perpendicular to the axis of rotation of said flywheel, said spacing being away from said plane in a direction away from said cover plate means, each of said two-arm lever means having a first arm and a second arm respectively extending radially outwardly and radially inwardly from the pivot means supporting same, means operatively connecting the first arms of said two-arm lever means with said pressure disc means, and a pressure member movable relative to and in axial direction of said output shaft and operatively connected to the second arms of said two-arm lever means and operable when moved axially toward said flywheel to actuate said pressure disc means through said two-arm lever means for disengaging said clutch.

2. A friction clutch according to claim 1, in which the center of gravity of each of said two-arm lever means is radially spaced from the axis of rotation of said flywheel by a distance less than the radial spacing of the respective said pivot means from the axis of rotation of said flywheel.

3. A friction clutch according to claim 1, in which each of said first lever arms has a lateral depression, and in which each of the means operatively connecting the first arms with said pressure disc means includes a tie-rod pivotally connected to said pressure disc means and also includes an intermediate member mounted on said tie-rod and having an edge portion in engagement with the depression of the respective adjacent first arm, and furthermore includes spring means mounted on said tie-rod and engaging the said first lever arm for maintaining said edge portion in engagement with said depression.

4. A friction clutch according to claim 3, in which the means for maintaining said tie-rod in engagement with said depression includes an adjustable nut on said tie-rod bearing on said one lever arm on the side thereof opposite said spring means.

5. A friction clutch according to claim 1, which includes spring means interposed between said pressure member and the inner ends of said second arms for urging said pressure member and said inner ends of said arms into engagement with each other.

References Cited

UNITED STATES PATENTS

| | | | |
|---|---|---|---|
| 2,037,610 | 4/1936 | Worner | 192—68 |
| 2,072,117 | 3/1937 | Lewis | 192—105 |
| 2,406,244 | 8/1946 | Nutt. | |
| 2,810,464 | 10/1957 | Geibel | 192—109 |
| 2,952,453 | 9/1960 | Haussermann | 192—89 X |
| 3,254,747 | 6/1966 | Werner | 192—68 X |

MARK NEWMAN, *Primary Examiner.*

ARTHUR T. McKEON, *Examiner.*